United States Patent Office 3,015,607
Patented Jan. 2, 1962

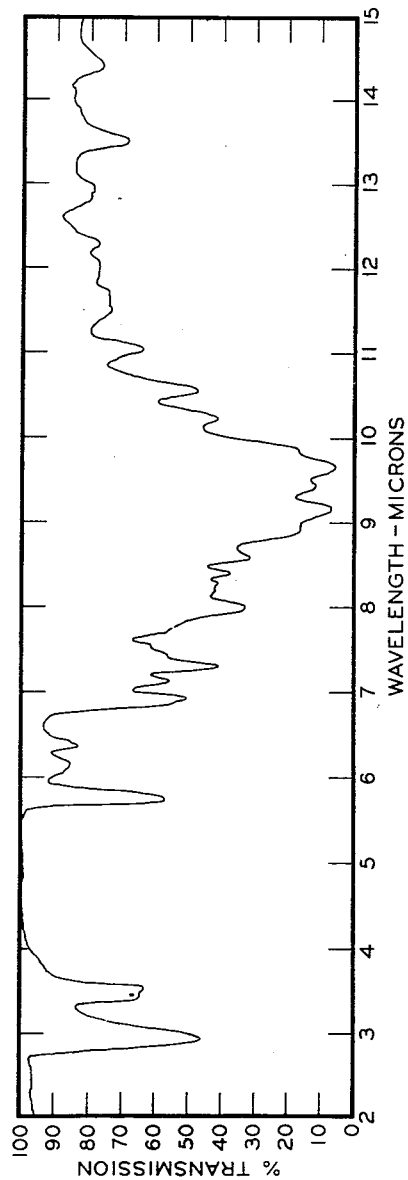

3,015,607
CURAMYCIN AND ITS PRODUCTION
Maria Susana Cataldi, Vicente Lopez, Oscar Luis Galmarini, Martinez, and Jose Pahn, Villa Bosch-San Martin, Argentina, assignors to Olin Mathieson Chemical Corporation, New York, N.Y., a corporation of Virginia
Filed June 17, 1959, Ser. No. 821,017
5 Claims. (Cl. 167—65)

This invention relates to a new and useful antibiotic and its derivatives.

More particularly, it relates to the new antibiotic originally called audricurin and now known as curamycin, in its various forms.

Curamycin is formed by cultivation, under controlled conditions, of a hitherto undiscovered microorganism, which, in conformity with the taxonomical system of Bergey's Manual of Determinative Bacteriology, 6th edition 1948, is a species of the genus Streptomyces, and is herein called *Streptomyces cura-coi*. *Streptomyces cura-coi* useful for the preparation of curamycin is obtained from soil samples found in La Joponesa, Province of Pampa, Cura-coi, Argentina, and a sample of the living organism has been deposited in, and made part of the stock culture collection of, the American Type Culture Collection, Washington, D.C., from whence it is available under accession number ATCC 13,385.

THE MICROORGANISM

*Streptomyces cura-coi* develops abundantly in cultivation media normally useful for cultivation of other organisms of the same genus. It is aerobic, gram positive, non-acid resistant, produces abundant white and yellow branched mycelia and its conidiospores are dense and spiraled. It is capable of development in a solid synthetic medium at temperatures of about 22° C. to 46° C., optimum temperature being around 25° C. The vegetative mycelium and its ramifications measure about 1.0 micron, and the aerial mycelium measure about 1.2 microns, in diameter. The conidiospores are spherical and measure approximately 0.8 to 1.2 microns. The physiological behavior of the culture is detailed in Table I, and unless otherwise indicated, the table refers to a culture in the tenth day of its development. The colors which are given following the description, have been for the most part designated according to the system in the text Color Standards and Color Nomenclature, by R. Ridgway, Washington, 1912.

*Streptomyces cura-coi* is classified on the basis of its cultural character in the group A–II–L of the classification system of Waksman and Henrici (published by S. A. Waksman and H. A. Lechecalier in Actinomyces and Their Antibiotics, Balto. 1953), but differs noticeably from the other members of the group.

It is to be understood that the process of this invention is not limited to the use of the microorganism described in the following table but includes inter alia, variations and mutants obtained by treatment of the microorganism with ultraviolet rays, X-rays, manganese chlorides, camphor, nitrogen mustards and other mutating agents, as well as polyploids of the various mutants.

*Table I.—Character of Streptomyces cura-coi cultures*

| Cultivation Medium | Description |
|---|---|
| Plate of Czapek agar | Abundant vegetative mycelia of cinnamon (R) color. White dried aerial mycelium, sometimes covered with droplets of water. Spores rapidly cover the colony and are white. Colonies are large, cracked and very corrugated. Border very irregular. Back is colored cinnamon (R) with verona brown (R) border. |
| Plate of agar glucose asparagine (Uschinsky). | Abundant vegetative mycelia of cinnamon (R) color. Abundant white aerial mycelium covers the colony. Spores are colored glaucous greenish-blue (R) and in moderate quantity. Colonies are large, very corrugated and elevated in the center. Borders submerged in agar and with cracked very distinct radial folding. Back is cinnamon (R) colored. No soluble pigment formed. |
| Plates of agar-calcium malate (Krainsky). | White vegetative mycelia with cinnamon buff (R) circular zone. Small, white aerial mycelium present only in the center of the colony. Very scanty sporulation of glaucous greenish-blue (R) color. Large, flat colonies with a broad radial border and granulated center. White back with a circular zone of cinnamon buff (R) color. No soluble pigment formed. Strongly attacks the calcium malate. |
| Plates of starch agar | Very abundant cinnamon buff (R) colored vegetative mycelia. Very abundant white, aerial mycelium. Sporulation only in the center of the colony of glaucous greenish-blue (R) color. Large colonies all centrally submerged. Border irregularly radiated. Back of cinnamon buff (R) color, with patches of verona brown (R). No soluble pigment formed. Hydrolysis of the starch very marked (broad zone around the colony). |
| Plates of nutrient agar | Vegetative mycelia very abundant of tanned olive (R) color. Very abundant aerial mycelium covering the entire colony and colored cottony white. Sporulation is glaucous greenish-blue (R) and very scanty, covering only the center. Colonies of moderate development with submerged center and granular surface. Borders are irregularly radiated. Back of verona-brown (R) with black patches. Soluble pigment of verona brown (R) color. |
| Plates of blood-agar | Large elevated colonies superficially corrugated. No aerial mycelium or spores formed. Back colored black. Dark brown, almost black soluble pigment formed. No zone of hemolysis. |
| Plates of AMD medium (Duggan agar Asparagine-meat dextrose). | Cinnamon (R) vegetative mycelia. White, scanty aerial mycelium in isolated patches which later cover the entire colony. Moderate glaucous greenish-blue (R) sporulation. Colonies of moderate development and superficially very corrugated. Border very irregular. Back cinnamon (R) color. No soluble pigment formed. |

| Cultivation Medium | Description |
|---|---|
| Synthetic agar containing:<br>Glucose, 0.1 g<br>Calcium gluconate, 2.5 g<br>Ammonium phosphate, 0.4 g<br>Potassium chloride, 0.08 g<br>Magnesium chloride, 0.418 g<br>Manganese chloride, 0.036 g<br>Ferichloride, 0.023 g<br>Zinc sulfate, 0.045 g<br>Cobalt chloride, 0.004 g<br>Agar, 20 g<br>Distilled water, q.s., 1.000 ml. | Cinnamon buff (R) vegetative mycelia.<br>Abundant aerial mycelium which cover the whole colony.<br>Cottony white. Abundant sporulation of glaucous greenish blue (R) color.<br>Large colonies of submerged center and very irregular and radiated borders.<br>Back colored cinnamon buff to tobacco brown.<br>No soluble pigment formed. |
| Medium of Hickey and Tresner (Jour. Bact., vol. 63, pg. 891 (1956)). | Verona brown (R) vegetative mycelium.<br>Very abundant white aerial mycelium covering the entire colony.<br>Scanty sporulation of glaucous greenish blue (R) color.<br>Colonies elevated very corrugated and of moderate development.<br>Back colored verona brown to tobacco brown.<br>Soluble pigment of tobacco brown color. |
| Cellulose agar | No development. |
| Glucose-agar | Verona brown (R) vegetative mycelia.<br>Very abundant cottony white aerial mycelium, encompass most of the entire colony. Sporulation in the central part of the colony is colored glaucous greenish blue (R).<br>Corrugated colony of moderate development.<br>Back of cinnamon (R) color with verona brown (R) spots.<br>Soluble pigment of sayal brown (R) color. |
| Potato wedge | Vegetative mycelium is very corrugated and of verona brown (R) color.<br>Very scanty aerial mycelium with gray colored spores.<br>Soluble pigment of verona brown (R) to warm sepia with a tendency toward black. |
| Carrot wedge | Very abundant corrugated development. Vegetative mycelia of cinnamon (R) color. Very little white aerial mycelium.<br>Obscures the carrot. No sporulation. |
| Gelatin | Not liquefied. |
| Emerson Medium | Abundant development in the form of very corrugated rings of brown color with small aerial mycelium.<br>No spores.<br>Soluble pigment of verona brown (R). |
| Nitrate broth | Nitrates not reduced. |
| Litmus milk | At 25° C. to 37° C. no coagulation, no alkalinization or peptonization.<br>Forms a strong pigment of verona brown (R) color in the top part of the tube. |

FERMENTATION

The enviroment and nutritional requirements for the fermentation of *Streptomyces cura-coi* are similar to those necessary for the production of antibiotics by other aerobic microorganisms. Thus, aerobiosis can be obtained by the use of a liquid nutrient medium and a sterile culture in flasks placed on shaking machines. For industrial production metal tanks with internal aeration and agitation by means of paddles can be substituted. Curamycin can also be produced by surface cultivation. The microorganism requires as nutrient elements, one or more sources of energy and carbon, organic nitrogenous substances and mineral salts. Cultivation is best effected when the initial pH of the cultivation medium is between about 6.6 and 8.2, with the optimum pH being around 7.0 to 7.5.

The utilizable sources of carbon for the production of the antibiotic are very diverse, there being included inter alia sugars (such as glucose, lactose, maltose, sucrose), dextrin, starches of different types of origin, glycerol (and other polyalcohols) inositol and animal and vegetable fats, as well as esters thereof. The sources of organic nitrogen which actively stimulate growth and favor production of curamycin are substances such as soybean meal, cottonseed meal and other vegetable meals (whole, or partially or totally defatted), meat fours or animal viscera, various peptones, casein hydrolysates, soybean hydrolysates, lactalbumin, wheat glutins, distillers solubles, corn steeps, urea and amino acids. Mineral salts, such as the chlorides, nitrates, sulfates, carbonates and phosphates of sodium, potassium and calcium, should be included in appropriate concentrations. The nutritive medium should contain traces of metals such as magnesium, iron, copper, manganese, zinc and cobalt, the latter metal being utilized as a precursor when the concomitant production of vitamin $B_{12}$ is desired.

For the adjustment of pH during the course of the fermentation it is preferred to add buffering agents, such as calcium carbonate. Moreover it is convenient to control the tendency toward alkalinity occurring during the final stage of the fermentation through addition of acid substances or by means of slow-feed of sugar, thereby prolonging the period of productivity. If necessary, an anti-foaming agent may be added to the fermentation medium.

Under the described conditions and with the temperature of cultivation at about 25° C., maximum production of curamycin is obtained between 1 and 10 days (usually between about 36 to 80 hours in tanks).

The inoculum for the fermentation can be provided from suspensions of spores or of lyophilized mycelia, freeze-dried with an inert substrate. It is usually transferred through one or more passages in liquid media before the final fermentation.

EXTRACTION OF CURAMYCIN

The elimination of the mycelia is effected efficiently by filtration in the pH range of 7.0 to 9.5 wherein the stability of curamycin is the greatest. The filtration is effected with ease but can be improved by the addition of a filter-aid in adequate amounts. It may be useful, especially since it suppresses the emulsification of the solvent during the extraction step, to add a coagulant such as aluminum sulfate. This may be done by adding a sufficient quantity of an aqueous concentrated solution of aluminum sulfate to the crude broth to supply about 6 gm. of salt per litre of broth. The addition is made slowly, preferably with agitation, and with continuous pH correction by addition of an aqueous solution of a base, e.g., ammonia, in such a manner that the pH does not fall below about 6.0. Completing the addition of the coagulant, the pH is adjusted between 7.0 and 9.5 by addition of a base with agitation and then filtered in the presence of a filter-aid. The filter cake is washed with about 20% of its weight in water.

The filtrate contains all the activity of the original broth. The active substance can be extracted therefrom easily at pH 7.0 with solvents which are immiscible with water, especially the aliphatic alcohols of 4 or more carbon atoms (such as n-butanol) and the organic esters of lower alcohols (such as the acetates of ethyl and butyl alcohol). When the extraction is effected with the ethyl acetate, evaporation under vacuum produces a concentrate which upon cooling separates into colored needles of practically pure curamycin (M.P. about 190° C.) which recrystallizes from isopropanol into white crystals M.P. about 196° C. If an immiscible alcohol is employed for extraction, a convenient procedure for the purification of the antibiotic consists in concentrating the alcoholic extract by evaporating on a water bath to dryness, and extracting the insoluble solid with ethyl acetate. This purified extract treated as above, produces crystals of high purity (M.P. about 190° C.).

The following examples illustrate methods for preparing and extracting curamycin and conversion thereof to certain derivatives:

*Example I*

A suspension of growing spores of an 8 day culture of

*Streptomyces cura-coi* ATCC 13,385 on synthetic agar medium is cultivated in tubes, each containing 5 ml. aliquots of the following sterilized culture medium:

| | | |
|---|---|---|
| Defatted soybean meal | g | 30 |
| Glucose | g | 30 |
| Enzyme hydrolysate (Triptocase of casein) | g | 0.15 |
| Calcium carbonate | g | 2 |
| Water | liter | 1 | pH adjusted to 7.2

The tubes are incubated at 24° C. on a vibrating shaker (120 r.p.m., 5 cm. of amplitude. After 48 hours, 10 cc. of the resulting culture is transferred to each of fifty 500 ml. Erlenmeyer flasks, each containing 100 ml. of the same medium. The flasks are then agitated for five days at 24° C. employing the same shaking machine. The broth is harvested and pooled, and the mycelium eliminated by centrifugation; the supernatant liquid demonstrates antibacterial activity against the following bacteria: *Staph. aureus, S. haemolyticus, B. subtilis, Streptococcus faecalis, S. agalactiae* and *B. polymyxa*.

Example II

The growing spores of a 12 day culture of *Streptomyces cura-coi* ATCC 13,385 on Emerson medium are cultivated in 1000 ml. Erlenmeyer flasks each containing 50 ml. of the following sterilized medium:

| | | |
|---|---|---|
| Cottonseed meal | g | 40 |
| Glycerin | g | 20 |
| Potassium chloride | g | 0.2 |
| Distillers' solubles | g | 0.39 |
| Distilled water | ml | 1000 |

After four days of static culture at 24° C. the microorganism develops on the surface of the medium. 200 ml. of the same medium are then added to each flask and the flasks are placed on a reciprocating shaker. Curamycin is produced on about the fourth day, production reaching a maximum on the fifth day and thereafter maintaining the same approximate potency level until the seventh day at which time the fermentation is interrupted.

The average potency of the ten flasks is about 3600 du./ml. as measured against *Staphylococcus aureus* and about 6000 du./ml. as measured against *S. haemolyticus*.

The broth is centrifuged and the supernatant liquid concentrated under vacuum to one tenth the original volume. The liquid concentrate shows chemotherapeutic activity in the mouse against *S. aureus* and *S. haemolyticus* infections. For this in vivo test, conventional methods are used.

Example III

A. FERMENTATION

Into an assay tube is placed 5 ml. of medium I having the following composition:

| | Percent |
|---|---|
| Soy meal | 3 |
| Glucose monohydrate | 3 |
| Calcium carbonate | 0.2 |
| Protein hydrolysate | 0.015 |

Sterilization at pH 6.5 for 1 hour at 121° C. pH after sterilization adjusted to 7.0.

The medium is seeded with a week old culture of *S. cura-coi* ATCC 13,385 and incubated on a shaking machine at a temperature of 25° C. After 72 hours, the culture in each tube is transferred to a 250 ml. flask containing 50 ml. of medium II having the following composition:

| | Percent |
|---|---|
| Soy meal | 1.5 |
| Calcium carbonate | 0.25 |

10 cc./L. of mineral solution of the following composition:

| | | |
|---|---|---|
| Zinc sulfate .7 $H_2O$ | g | 8.8 |
| Iron sulfate .7 $H_2O$ | g | 3.35 |
| Copper sulfate .5 $H_2O$ | g | 2.5 |
| Magnesium sulfate .1 $H_2O$ | g | 15.4 |
| Cobalt chloride .6 $H_2O$ | g | 4 |
| Nickel chloride .6 $H_2O$ | g | 5 |
| Potassium dichromate | g | 5.7 |
| Sodium selenate .1 $H_2O$ | g | 3.5 |
| Calcium chloride .2 $H_2O$ | g | 36.7 |
| Aluminum sulfate .18 $H_2O$ | g | 123 |
| Magnesium sulfate .7 $H_2O$ | g | 507 |
| Sodium chloride | g | 125 |
| Potassium monophosphate | g | 350 |
| Water | l | 10 |

Sterilized two times at pH 6.5 one hour at 121° C., each time. 30 hrs. between sterilizations. pH after sterilization adjusted to 7.0.

The culture is incubated for 72 hours, at 25° C., on a shaking machine. The material in each flask is then used to seed 1 liter of the same medium contained in a 4 l. flask and the seeded medium is incubated utilizing the same incubation procedure. In this manner two additional passages are conducted using medium II and seeding each with 10% v./v. of fermented broth from the immediately preceding fermentation. 0.75 liters of growing material from the final fermentation is used to seed a fermentation tank containing 29 liters of sterile aqueous medium III of the following composition:

| | Percent |
|---|---|
| Soy meal | 3 |
| Calcium carbonate | 0.25 |
| Sodium chloride | 0.1 |
| Lard oil | 0.4 |
| Cobalt solution (5%) | 0.01 |
| Glucose monohydrate | 2.2 |

Sterilization for 60 min. at 121° C.

The seeded medium is fermented at 25° C. with constant agitation and aeration, and addition of lard oil as the antifoaming agent, and Foamex as the surface active agent. After 48 hours, the fermentation is interrupted and the crude broth when tested against *Staph. aureus* shows an activity of over 250 du.-/ml.

B. EXTRACTION 27 liters of the crude broth from part A is filtered, the filtrate diluted with water, and then extracted twice with 25% v./v. butanol each time. The combined butanol extracts, showing an activity against *Staph. aureus* of 1000 du./ml. are concentrated on a water bath to a volume of 500 ml. forming an abundant precipitate. pH is adjusted to 7.0 and the material is then extracted twice with 50% v./v. ethylacetate each time. The ethylacetate phase is concentrated at pH 7.0 yielding crystals of curamycin weighing about 550 mg. and having an activity of 600 du./mg. against *Staph. aureus*. The overall yield based on the crude broth is about 61%.

C. ALTERNATIVE EXTRACTION

Twenty liters of crude broth obtained in part A is filtered at pH 7.5 and concentrated to a potency of 1600 du./ml. (*S. aureus*). The concentrate is twice extracted with 15% v./v. ethylacetate each time. The combined extracts are concentrated to 500 ml. and allowed to stand on ice overnight. Crystals separate and are filtered, washed with ethylacetate and dried under vacuum. There is obtained 1.085 g. of white crystals of curamycin assaying 15,000 du./mg. (*Staph. aureus*). The overall yield based on the crude broth is about 51%.

Example IV

A. FERMENTATION 0.05 grams of spores of *Streptomyces cura-coi* ATCC 13,385, preserved on sterile soil, are added to 50 ml. of sterile aqueous broth of the following composition:

| | Percent |
|---|---|
| Soy meal | 3 |
| Calcium carbonate | 0.2 |
| Protein hydrolysate | 0.15 |
| Glucose | 3 |

Sterilization at pH 7.9 for 30 min. at 121° C.

The broth is germinated statically for 72 hours at 25° C., after which time it is used to seed 750 ml. of the same sterile broth in a 4 liter flask and the latter is agitated for 30 hours at 25° C. on a reciprocating shaker adjusted for 120 2" strokes per minute. 800 ml. of this broth is used to seed 25 liters of the same medium (prepared as above except for the separate sterilization of the glucose and protein hydrolysate for 30 minutes at 121° C.) in a 40 liter tank. This medium is fermented at 25° C. with aeration and agitation. Lard oil is added to the broth as needed to decrease foaming. A positive pressure of 0.7 kg./cm.$^2$ is maintained in the tank. Fermentation conditions are maintained for 60 hours, after which time it is interrupted. The final broth is measured against *Staph. aureus* and found to have a potency of 500 du./ml.

B. EXTRACTION 77 liters of filtered broth (obtained in part A) having an activity of 500 du./ml. (*S. aureus*) is twice extracted with first 30% v./v. and then 25% v./v. of butyl acetate at pH 7.0 leaving only 3% of the original activity in the extracted broth. The combined extracts are concentrated on a water bath until it has an activity of 900 du./ml. i.e., 785 ml.; the extracts are washed with 400 ml. of water at pH 7 and concentrated to a volume of 50 ml. Curamycin crystallizes in this solvent and upon evaporation there is obtained 1.4 g. of curamycin in the form of crystals having a potency against *Staph. aureus* of 1200 du./mg. The yield is about 43.5% of the original activity of the crude broth.

C. ALTERNATIVE EXTRACTION (1)

25 liters of crude broth obtained in part A is filtered and concentrated to a volume of 15 l. having an activity of 1320 du./ml. The concentrate is twice extracted with 25% v./v. ethyl acetate and the combined ethyl acetate extracts having a volume of 4.80 l. are concentrated under vacuum to a volume of 30 ml. This concentrate is permitted to stand overnight on ice. Evaporation of the solvent leaves 0.945 g. of white crystals of curamycin which assay 8000 du./mg. (*Staph. aureus*). The yield in potency is 38% of the original broth.

D. ALTERNATIVE EXTRACTION (2)

18 l. of the filtered broth, obtained in part A and assaying 520 du./mg. (*Staph. aureus*) is twice extracted with 25% v./v. of butyl acetate each time. The organic extract is concentrated under vacuum to a volume of 50 ml. and cooled to 5° C. for 15 hours. Colorless crystals of curamycin separate and are filtered, washed with fresh solvent and dried under vacuum. The crystals weigh about 0.55 g. and assay 8000 du./mg. (*Staph. aureus*). The yield in potency is 38% of the original broth.

E. METHYL DERIVATIVE OF CURAMYCIN 300 mg. of the curamycin is dissolved in a mixture of 18 ml. of absolute ethanol and 7.2 ml. of ethyl acetate. An excess of ethereal solution of diazomethane is added and the yellow solution left in a cold room for 72 hours. The solvent is then evaporated and the dry residue recrystallized by dissolving in acetone and precipitating with benzene. 227 mg. of colorless prisms of M.P. 224° is obtained. The product formed is the methyl ether of curamycin, formed with the phenolic group present in curamycin. Elemental analysis is as follows: C, 49.93; H, 6.45; Cl, 5.50; OCH$_3$, 11.59.

F. ACYLATION OF CURAMYCIN 100 mg. of crystalline curamycin is dissolved in 2 ml. of pyridine and 2 ml. of acetic anhydride is added. The solution is left at room temperature for 72 hours and then poured into a mixture of ice and water (about 20 ml.) A white precipitate is collected, washed with water and dried. This product is purified by dissolving it in hot dilute ethanol and cooling. 90 mg. of the product, a white non-crystalline powder with a melting point of 174–175° C., is obtained.

CHEMICAL PROPERTIES OF CURAMYCIN

Crystalline curamycin, is in the form of colorless needles melting at about 196° C. It is soluble in 0.1N sodium hydroxide, ethylacetate, butylacetate, chloroform, isopropanol, acetone, pyridine and acetic acid; slightly soluble in methanol, 96% ethanol, and ethylether; and insoluble in benzene, petroleum ether, water, 10% sodium bicarbonate and 10% sodium carbonate.

Two specimens of curamycin melting at 196° C. and recrystallized from isopropanol and three times from an ethanol-petroleum ether mixture, gave the following average analysis:

| | |
|---|---|
| C | 48.89%. |
| H | 6.52%. |
| Cl | 5.16%. |
| O | 39.43% (by difference). |
| OCH$_3$ | 8.90%. |
| C—CH$_3$ | 9.52%. |
| $[\alpha]_D$ | −5.5° (in chloroform). |

The ultraviolet absorption spectrum of curamycin dissolved in ethanol presents a single maximum at $$280 \text{ m}\mu \ (E_{1 \text{ cm.}}^{1\%} = 11)$$

When dissolved in 0.1N sodium hydroxide, the maximum shifts to $$295 \text{ m}\mu \ (E_{1 \text{ cm.}}^{1\%} = 65)$$

The infra-red spectrum determined in Nujol is reproduced in the drawing. It is characterized by the presence of bands at the following wave lengths (in microns):

| | |
|---|---|
| 2.95 | 8.90 |
| 3.4–3.55 | 9.18 |
| 5.75 | 9.42 |
| 6.15 | 9.65 |
| 6.36 | 9.85 |
| 6.93 | 10.23 |
| 7.13 | 10.55 |
| 7.30 | 11.05 |
| 7.43 | 11.5–11.7 |
| 7.53 | 12.05 |
| 7.72 | 12.30 |
| 8.0 | 12.85 |
| 8.2 | 12.95 |
| 8.28 | 13.52 |
| 8.40 | 14.3 |
| 8.58 | |

The thermal stability of curamycin in aqueous medium varies considerably with the pH. As indicated by the following values, the antibiotic activity measured against *S. aureus* disappears rapidly at pH 2.0, but less rapidly at pH 9.5.

*Percent of original activity*

| | 25° C., 24 hrs. | 100° C., 7 min. |
|---|---|---|
| | Percent | Percent |
| pH 2 | <5 | <5 |
| pH 7 | 100 | 75 |
| pH 9.5 | 50 | 20 |

From the inactivated acid solution it is possible to isolate a crystalline degradation product containing chlorine and lacking biological activity. It crystallizes from chloroform in white needles of M.P. 146° C., $[\alpha]_D^{25}$ +17.4° (methanol).

Its elemental analysis gives the following values: C, 45.78%; H, 4.85%; O, 31.09%; Cl, 18.28; C—CH$_3$, 12.72%; OCH$_3$, 9.07%.

Dissolved in methanol, it shows an absorption maximum at $$287 \text{ m}\mu \text{ } (E_{1\text{ cm.}}^{1\%}=42)$$

In 0.1N sodium hydroxide, the maximum shifts to $$297 \text{ m}\mu \text{ } (E_{1\text{ cm.}}^{1\%}=118)$$

Curamycin, like its crystalline degradation product gives a positive reaction with Tollens, Molisch and anthrone reagents. The following reaction colors give a concise character differential:

|  | Curamycin | Product of Acid Degradation |
|---|---|---|
| Fehling | negative | positive. |
| Folin | do | Do. |
| FeCl$_3$-K$_3$Fe(CN)$_6$ | do | Do. |
| Diazotized Benzidine | do | Do. |

Curamycin is neither a base nor a carboxylic acid. Its weakly acidic properties derive from a phenolic group which allows its dissolution in alkaline solution. Two derivatives of the antibiotic may be prepared by modification of the phenolic group: one crystalline (the methyl derivative described hereinbefore) and the other amorphous (the acetyl derivative). Proof of the blocking of the phenolic group in these derivatives is that they give the negative reaction in Millon's test, while curamycin gives a positive one. Millon's test is specific for free phenolic groups.

When curamycin is hydrolyzed for 30 minutes at 100° C. with 0.1N hydrochloric acid and then cooled, crystals of the degradation product described hereinbefore separate out. The acid mother liquor is neutralized with Amberlite IR4B resin (weakly basic, phenolic amino type) and then lyophylized. The lyophylizate reduces Fehling solution and gives a positive Molisch reaction. On paper chromatography employing a water saturated butanol system, a brownish spot in Rf=0.32 develops on treatment with aniline phthalate reagent. If this product is hydrolyzed with 0.1N hydrochloric acid for 30 minutes at 100° C. and is neutralized as before employing Amberlite IR4B, paper chromatogram reveals three components when developed with aniline phthalate.

*System*

|  | Butanol 5, Ethanol 1, Water 4 | Butanol 3, Pyridine 2, Water 1.5 | Phenol saturated with water | Color with aniline phthalate |
|---|---|---|---|---|
| Component 1 | 0.63 | 0.74 | 0.84 | Red violet. |
| Component 2 | 0.53 | 0.62 | 0.77 | Brown maroon. |
| Component 3 | 0.31 | 0.48 | 0.48 | Red violet. |

CHROMATOGRAPHY OF CURAMYCIN

Crystalline curamycin is chromatographed. Paper chromatography confirms the distinction between curamycin and tetracycline, chloromycetin, carbomycin, erythromycin and novobiocin. The former has weakly acid character and high Rf with polar solvents. The pH of the solvent has little influence on the Rf value. On the paper, there is no trace of reaction to the following reagents: ninhydrin, aniline phthalate, silver ammonium nitrate, p-dimethylamino-benzaldehyde and phosphoric acid.

Comparison with other antibiotics:

| Solvent | Curamycin | Chloromycetin | Carbomycin |
|---|---|---|---|
| petroleum ether-p-toluene sulfonic acid-isopropanol | .98 | | |
| petroleum ether-KOH-isopropanol | .98 | | |
| 0.5 N AcOH | .00 | 82 | .75 |
| benzene-methanol | .58, 00 | 32 | .98 |
| dichloroethylene-water-acetic-acid | .97 | 87 | .00, 97 |
| ethylacetate-tert-butanol-water | .97, 00 | .97 | .18 (Erythro=.05) |

| | Curamycin | Novobiocin |
|---|---|---|
| isopropyl ether | .02 | |
| n-butanol-water-p-toluenesulfonic acid | .95 | .62 |
| n-butanol-water-piperidine | .90 | .56 |
| water-n-butanol | .90 | .81 |
| water-n-butanol-p-toluene sulfonic acid | .85 | .67 |

THERAPEUTIC PROPERTIES

Curamycin is highly active in vitro against gram positive organisms. In concentrations of less than 0.5 mcg./ml. of culture it effectively inhibits the growth of Staph. aureus, Streptococcus pyogenes, Bacillus subtillus, Streptococcus faecalis, Lactobacillus acidophilus, Neissera gonorrheae, Streptococcus haemolyticus, Streptococcus agalactiae and Bacillus polymyxa. Antibiotic concentrations of higher than 50 mcg./ml. of culture do not inhibit the growth of Aerobacter aerogenes, Escherichia coli, Pseudomonas aeruginosa, Salmonella schottmulleri, Proteus vulgaris, and Klebsiella pneumoniae. The antibiotic does not show cross resistance with the following known antibiotics: penicillin, streptomycin, chloramphenicol, tetracyline, oxytetracycline, chlortetracycline, carbomycin, erythromycin and streptothricin, that is to say that it is active against bacterial strains which are resistant to those antibiotics.

The subcutaneous administration of curamycin in mice infected with 10 to 100 fold lethal doses of Staphylococcus aureus M6 and Streptococcus haemolyticus gives protection to the animals as shown in Table 2, which also includes the therapeutic dose against the Meningo-pneumonitis virus in a chick embryo, the latter test being typical of the action of the antibiotic against the large viruses and rickettsias.

*Table 2*

| Infecting Agent | Method of infection | Curamycin | Percentage Living after 7 days | Survival time in hours |
|---|---|---|---|---|
| Staphlococcus aureus M6 | intravenous, 100×lethal dose | 4 doses of 2 mg | 90 | 129 |
| | | 4 doses of 1 mg | 100 | |
| | | 4 doses of 0.5 mg | 50 | 112 |
| | | 0 (control) | 0 | 60 |
| Streptococcus haemolyticus | intraperitoneal R1, 10×lethal dose | 4 doses of 2 mg | 90 | 139 |
| | | 4 doses of 1 mg | 60 | 125 |
| | | 4 doses of 0.5 mg | 40 | 106 |
| | | 0 (control) | 0 | 38 |
| Meningo-pneumonitis virus | yolk sac, 100×lethal doses | 1 dose of 2 mg | 90 | 179 |
| | | 1 dose of 1 mg | 60 | 170 |
| | | 1 dose of 0.5 mg | 30 | 170 |
| | | 1 dose of 0.25 mg | 10 | 152 |
| | | 0 (control) | 0 | 129 |

The effectiveness of curamycin in human beings has not as yet been demonstrated.

Curamycin is further useful by virtue of its high "in vitro" activity against Streptococci as an aid in the isolation of the causal organisms which infect areas of the host also normally occupied by living Streptococcus. If, for example, a specimen from an infected throat is grown on an isolation plate, Streptococci present will commonly outgrow an organism such as *Klebsiella pneumoniae* and obscure its occurrence. Curamycin can be used to control and inhibit growth of the Streptococci thereby aiding the determination of the presence of *K. pneumoniae* and a correct diagnosis of the nature of the infection.

The invention may be variously otherwise embodied within the scope of the appended claims.

What is claimed is:

1. Curamycin, a weakly acidic crystalline antibiotic active against gram positive microorganisms, melting at about 196° C., having the following average elemental analysis: C, 48.89%; H, 6.52°; and Cl, 5.16% $[\alpha]_D = -5.5°$ in chloroform, soluble in sodium hydroxide, ethyl acetate, chloroform, acetone and pyridine, having a maximum at 280 m$\mu$ in the ultraviolet spectrum in ethanol and characterized by bands in the infra-red spectrum in mineral oil as indicated in the drawing.

2. A process for the production of the antibiotic of claim 1 which comprises aerobically culturing *Streptomyces curacoi* in a nutrient medium comprising a source of energy, carbon, organic nitrogen and mineral salts at a pH of about 6.6 to about 8.2 and recovering said antibiotic from the fermentation medium.

3. A process as in claim 2 wherein the antibiotic is recovered from the nutrient medium by extraction with an organic, water-immiscible solvent.

4. A process as in claim 3 wherein the organic solvent is an aliphatic alcohol with more than 3 carbon atoms.

5. A process as in claim 3 wherein the organic solvent is ethyl acetate.

References Cited in the file of this patent

Pridham et al.: Antibiotics Annual, 1956–1957, pp. 947–953.

Pridham et al.: Applied Microbiology, January 1958, pp. 52–79.